Jan. 16, 1940. R. W. BUTLER 2,187,530
COMBINED LATCH AND DOVETAIL STRUCTURE
Filed July 5, 1935 3 Sheets-Sheet 1
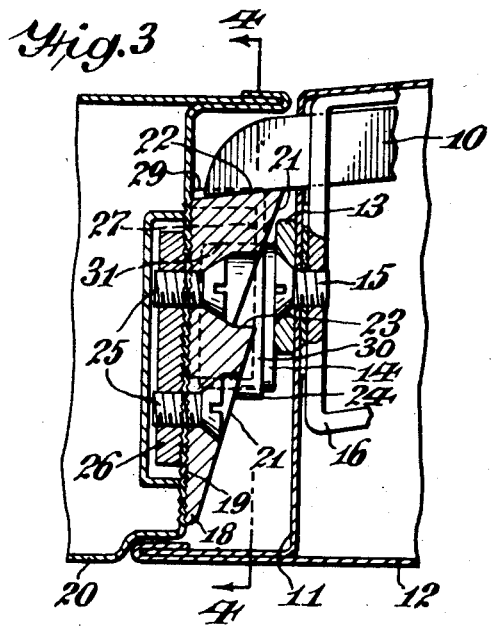
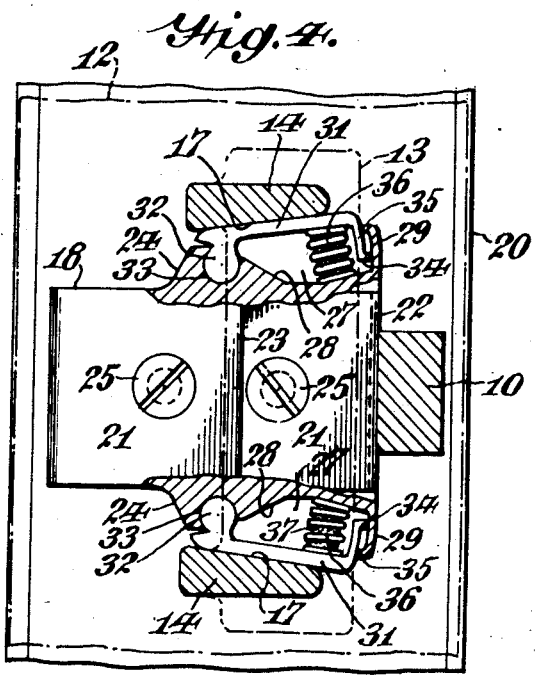
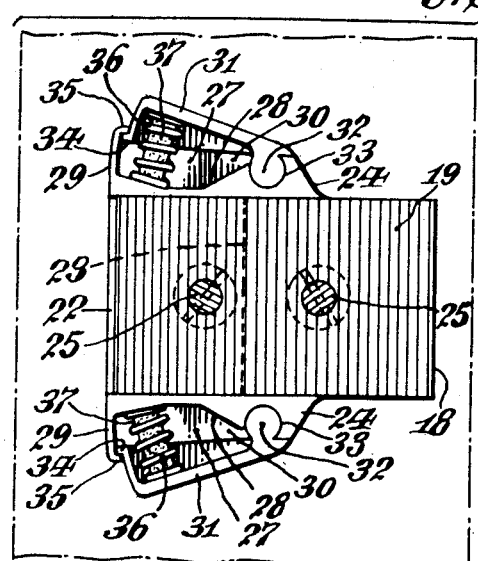
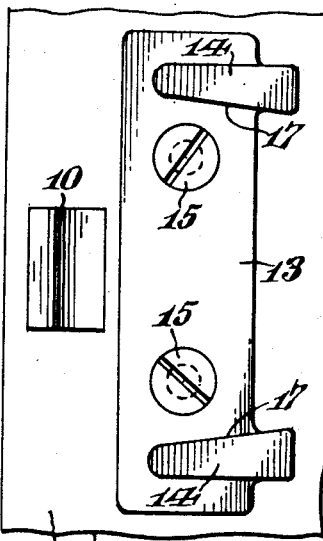
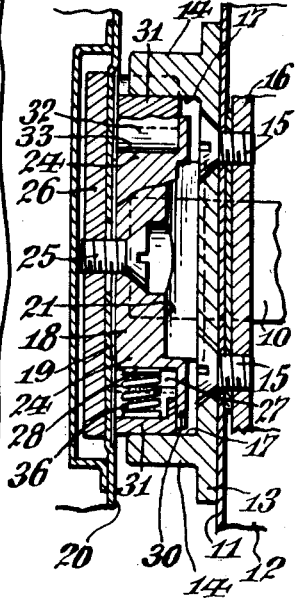
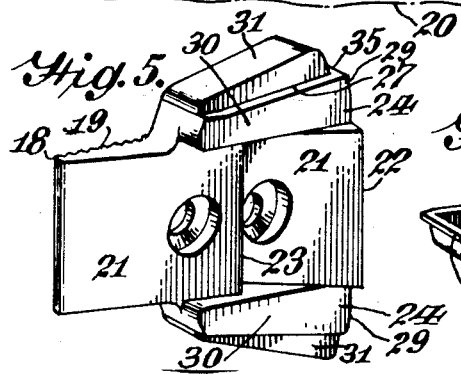
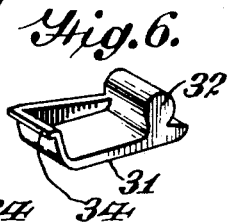
INVENTOR.
Robert W. Butler,
BY John D. Myers
ATTORNEY.

Jan. 16, 1940.    R. W. BUTLER    2,187,530
COMBINED LATCH AND DOVETAIL STRUCTURE
Filed July 5, 1935    3 Sheets-Sheet 2

INVENTOR.
Robert W. Butler,
BY John D. Myers
ATTORNEY.

Jan. 16, 1940.   R. W. BUTLER   2,187,530
COMBINED LATCH AND DOVETAIL STRUCTURE
Filed July 5, 1935   3 Sheets-Sheet 3
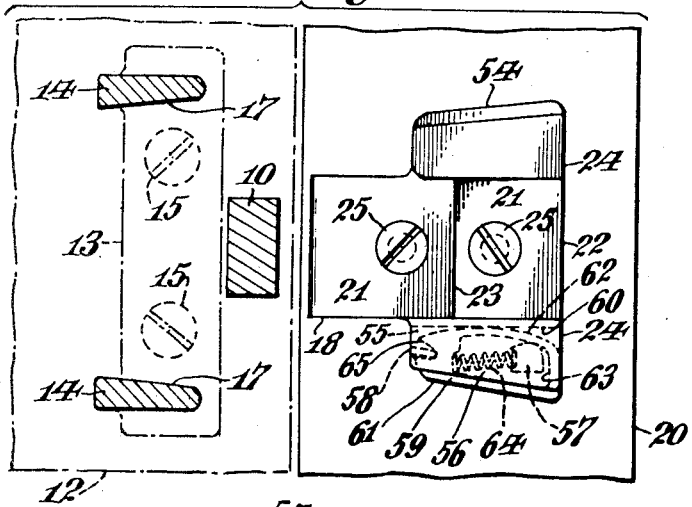
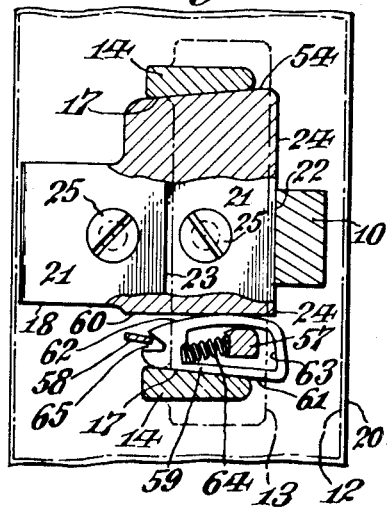
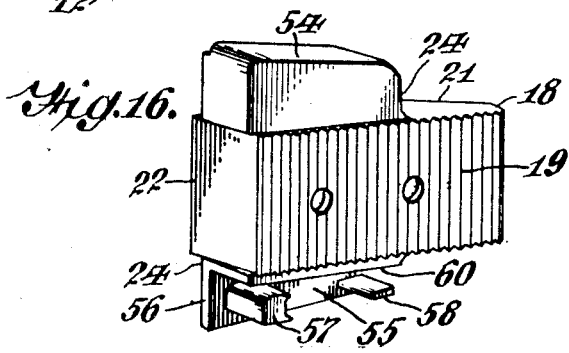
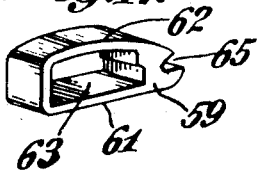
INVENTOR.
Robert W. Butler,
BY John D. Myers
ATTORNEY.

Patented Jan. 16, 1940

2,187,530

UNITED STATES PATENT OFFICE 2,187,530

COMBINED LATCH AND DOVETAIL STRUCTURE

Robert W. Butler, Philadelphia, Pa., assignor, by mesne assignments, to United Specialties Company, Detroit, Mich., a corporation of Delaware Application July 5, 1935, Serial No. 29,785

16 Claims. (Cl. 292—340)

The improvement has been designed particularly for use with automobile doors. The common practice heretofore has been to provide the door with a spring-pressed, retractable latch bolt for cooperation with a latch keeper mounted on the door frame, and to provide separate dovetail elements, mounted independently of the latch members on the door and door frame respectively, for properly alining the door when it is moved into completely closed position and for preventing undesirable noise or rattling by reason of the vibration of the door with respect to the frame when the door is in its closed position.

In accordance with the present improvements, one of the dovetail elements is combined with one of the latch elements and the combined structure is preferably secured to the door frame, while the other dovetail element is associated with the other latch element and carried by the free vertical edge of the door. As herein disclosed, the preferable arrangement of the various elements of the device is one in which the recess member of the dovetail is associated with the latch bolt on the edge of the door, and the wedge member of the dovetail is combined as a structural part of the latch keeper mounted on the door frame.

The invention has for one of its objects the provision of a combined latch and dovetail device which is so constructed as to properly position the door during the final closing movement thereof and to rigidly retain the door in its closed position. Another object of the invention is the provision, in a combined device of this character, of a structure which will properly support the door when in closed position and prevent undesirable vibration thereof with respect to the door frame. A further object of the invention is the provision of a combined latch element and dovetail element wherein the bearing members of the dovetail element are movable with respect to each other into proper make-up position with respect to the bearing members of the other dovetail element, at the same time forming a rigid support for the door when in its closed position. A still further object of the invention is the provision of a combined latch keeper and dovetail element wherein the dovetail bearing members are directly supported on the latch keeper to form the wedge element of the dovetail structure, the bearing members being movable relatively to each other and to the latch keeper into make-up position with respect to the recess element of the dovetail structure. The invention has for a still further object a simplification of latch and dovetail structures, and a reduction of the cost of manufacture thereof as well as a reduction of the cost of installation of the same upon an automobile.

Other objects and advantages of the invention will be apparent from the following description, taken with the accompanying drawings wherein:

Fig. 1 is a rear elevational view of one form of combined latch keeper and dovetail wedge element, and a front elevational view of the dovetail recess element and associated latch bolt employed with each of the different forms of the invention;

Fig. 2 is a vertical sectional view of the device shown in Fig. 1, with the parts in the position which they occupy when the door is completely closed;

Fig. 3 is a horizontal sectional view through the device shown in Fig. 1, with the parts in the position which they occupy when the door is completely closed;

Fig. 4 is a vertical sectional view through the device, taken on the line 4—4 of Fig. 3;

Fig. 5 is a front perspective view of the combined latch keeper and dovetail wedge element shown in Fig. 1;

Fig. 6 is a perspective view of one of the movable bearing members of the dovetail wedge element shown in Fig. 1;

Fig. 14 is a front elevational view of another form of combined latch keeper and dovetail wedge element, the cooperating dovetail recess element and latch bolt being shown in section and out of cooperative position with respect thereto;

Fig. 15 is a vertical sectional view, partly in elevation, showing the position occupied by the parts of the device of Fig. 14 when the door is in fully closed position;

Fig. 16 is a rear perspective view of the combined latch keeper and dovetail wedge element shown in Fig. 14, without the movable bearing block; and Fig. 17 is a perspective view of the movable dovetail bearing block shown in Fig. 14.

Figure 7:
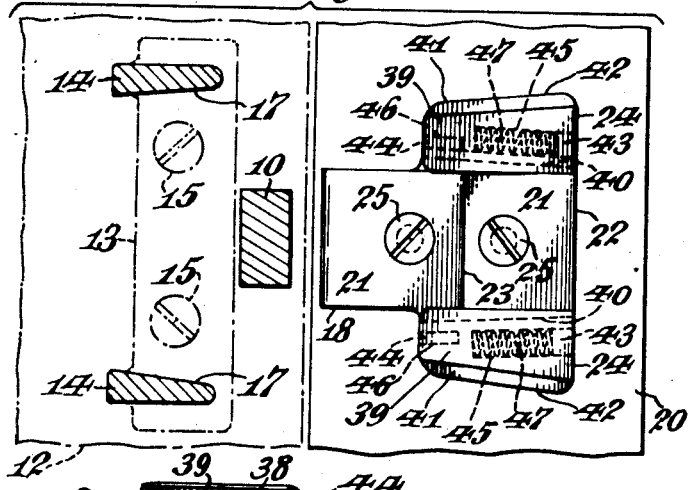
Fig. 7 is a front elevational view of another form of combined latch keeper and dovetail wedge element, the cooperating dovetail recess element and latch bolt being shown in section and out of cooperative position with respect thereto.
Figure 8:
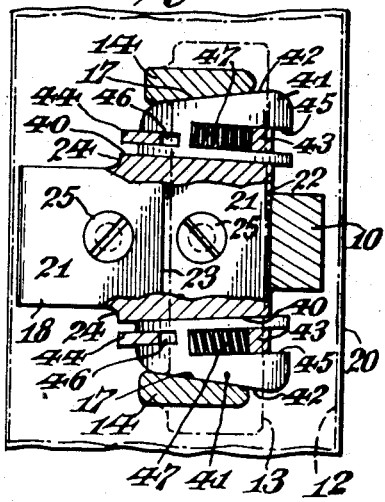
Fig. 8 is a vertical sectional view, partly in elevation, showing the position occupied by the parts of the device of Fig. 7 when the door is in fully closed position.
Figure 9:
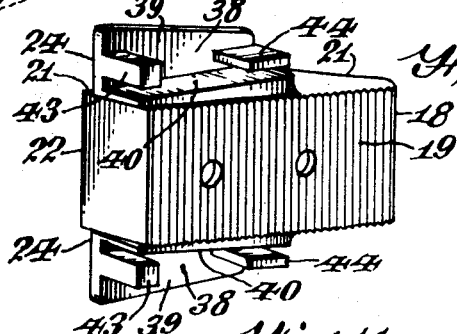
Fig. 9 is a rear perspective view of the combined latch keeper and dovetail wedge element shown in Fig. 7, without the movable bearing blocks.
Figure 10:
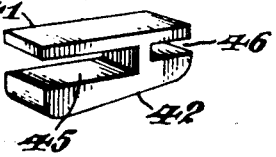
Fig. 10 is a perspective view of one of the movable bearing blocks of the dovetail wedge element shown in Fig. 7.

In the various forms of the invention disclosed herein, the dovetail recess element is associated with a spring-pressed latch bolt 10 projecting outwardly through the free vertical edge 11 of the door 12 and having suitable handles mounted on the door for retracting the same from latching position. Preferably the dovetail recess element utilized with the various forms of the invention comprises an elongated base plate 13 having a pair of spaced bearing members 14 formed thereon. The base plate 13 is secured to the edge of the door 12 by means of screws 15 extending through alined openings in the base plate and the edge of the door and threaded into a retainer plate 16 on the inside of the edge of the door.

The latch bolt 10 is supported on the door 12 in a position to project outwardly through the edge of the door near the inner face thereof as shown in Fig. 3, and the dovetail recess member is positioned on the edge of the door alongside the latch bolt 10, between the same and the outer face of the door, with the bearing members 14 equally spaced above and below the bolt. The opposing surfaces 17 of the bearing members 14 are preferably flat and are so formed as to diverge from each other in the direction of the latch bolt 10 when the parts are in position on the door.

The various forms of the invention disclosed herein utilize combined latch keeper and dovetail wedge structures that are similar in that they include a base plate 18 having one face thereof serrated or otherwise constructed as shown at 19 so as to permit adjustment on the door frame 20, and having the opposite face provided with a plurality of tapered keeper members 21 to form a main catch element 22 with which the latch bolt 10 engages to retain the door in fully closed position, and an auxiliary catch element 23 with which the latch bolt engages to retain the door in partly closed position. The various forms of combined latch keeper and dovetail wedge element also include lateral extensions 24 arranged on the opposite edges of the base plate 18 and the latch keepers 21. The lateral extensions 24 constitute supports for bearing means of varying form which cooperate with the bearing members 14 of the dovetail recess member, as hereinafter described in detail.

The different forms of combined latch keeper and dovetail wedge element shown in the drawings are adjustably secured to the door frame 20 by means of screws 25 extending through openings in each of the keeper members 21. The heads of the screws 25 are preferably countersunk in the tapered faces of the keeper members 21 and the threaded portions thereof engage with threaded openings in a retainer plate 26 on the inside of the door frame, as clearly shown in Fig. 3. By serrating the inner face of the base plate 18 and forming corresponding serrations on the door frame 20 and the retainer plate 26, and by providing enlarged openings in the door frame for the screws 25, it will be apparent that the combined latch keeper and dovetail wedge element may be readily adjusted with respect to the door frame in order that it may be properly positioned with respect to the latch bolt 10 and the recess element of the dovetail structure.

In the improved form of combined latch keeper and dovetail wedge element shown in Figs. 1 to 6 of the drawings, each of the lateral extension 24 is provided with a recess 27 having an irregular bottom wall 28, a front wall 29 and an outer wall 30. Mounted in each recess 27 is a movable bearing member 31 having a cylindrical support 32 integrally formed on one end thereof for seating within a bearing opening 33 in the body of the extensions 24. The free ends of the bearing members 31 are movable toward and away from each other, movement away from each other being limited by the engagement of an outwardly turned flange 34 on the bearing member with the inturned edge 35 of the wall 29. Movement of the free ends of the bearing members 31 toward each other is resisted by means of a pair of coiled springs 36 having one end in engagement with the bearing member 31 and the other end in engagement with the wall 28. A cylindrical block of compressible felt 37 or other material having lubricant incorporated therein may be encased within each of the coiled springs 36 if desired.

As will be noted from Fig. 1 of the drawings, there is no inner wall for the recess 27 inasmuch as that side of the recess is closed by the door frame 20 when the combined latch keeper and dovetail wedge element are assembled thereon. The bearing opening 33 is slightly more than semi-circular in cross-section, and the cylindrical support 32 is inserted endwise into the opening from the inner face of the combined latch keeper and dovetail wedge member before the latter is assembled on the door frame.

In assembling the parts of the structure shown in Figs. 1 to 6 of the drawings on an automobile, the dovetail recess element is secured to the edge of the door in the manner heretofore described. The position of the latch bolt 10 being fixed, as a rule, with respect to the edge of the door, this position determines the location of the dovetail recess element and no adjustment of the recess element is required when its relative position with respect to the latch both has once been determined. The combined latch keeper and wedge element is located on the door frame in such a position vertically of the frame as to retain the door in proper alinement with the frame, and is secured in such adjusted position transversely of the frame as to enable the latch bolt 10 to engage with the main catch element 22 when the door is fully closed. It will be apparent, therefore, that the position of the latch bolt 10 determines the location of the dovetail recess element on the edge of the door, and the only adjustment of parts that is required in the assembly of the latch elements and the dovetail elements is the adjustment of the combined latch keeper and dovetail wedge element with respect to the door frame.

When the device illustrated in Figs. 1 to 6 is in use with a door which is properly alined with respect to the door frame the two bearing members 14 engage substantially simultaneously with the bearing members 31 to rock these bearing members on their supports 31 as the door is moved into fully closed position, the advancing ends of the bearing members 14 engaging with the bearing members 31 to rock the free ends of the latter toward each other against the resistance of coiled springs 36. When the door is fully closed, as shown in Fig. 4, it is rigidly held against vertical movement by reason of the engagement of bearing members 14 with bearing members 31 and by reason of the rigid manner in which bearing members 31 are supported for rocking movement. In case the door is slightly out of alinement with the door frame, either on account of improper hanging or on account of sagging after continued use, one or the other of bearing members 14 will first engage with its cooperating bearing member 31 to rock the latter about its support 32 until the resistance to further movement of member 31 is sufficient to aline the door and thereby bring the other bearing member 14 into engagement with its cooperating bearing member 31, whereupon the movement of the door into its closing position continues until the latch bolt 10 is in position to engage with the main catch element 22. When the latch bolt 10 is retracted to permit the door to be opened the tendency of coiled springs 36 to expand acts upon the free ends of bearing members 31 and assists materially in moving the door from its fully closed position by reason of the cooperation of the bearing surfaces on members 31 with the inclined bearing surfaces 17.

In the modification of the combined latch keeper and dovetail wedge element shown in Figs. 7 to 10 of the drawings, each of the lateral extensions 24 is provided with a recess 38 having an outer wall 39 and a bottom wall 40 which forms a bearing surface for a slidable bearing block 41. The inner wall of the recess 38 is formed by the door frame when the combined keeper and wedge is assembled thereon. The outer face of each block 41 extends beyond the free edge of the wall 39 and forms an inclined bearing surface 42 for cooperation with the bearing surface 17 of one of the bearing members 14 of the dovetail recess element.

Supported on the wall 39 are two spaced guide lugs 43 and 44, the former extending into an elongated guide slot 45 in the inner end of the bearing block 41 and the latter extending into a short guide slot 46 in the outer end of the bearing block 41. A coiled spring 47 in the guide slot 45 and having one end in engagement with the end of the slot and the opposite end in engagement with the guide lug 43 serves to resist movement of the bearing block 41 in a direction to oppose closing movement of the door.

As shown in the drawings, it is preferable to form the walls or bearing surfaces 40, upon which the inner faces of the bearing blocks 41 are supported, so that these surfaces converge toward the horizontal center line of the latch keeper in order that the bearing blocks may have a slight movement of approach toward each other as the door moves into its final closed position. This arrangement of the bearing surfaces 40 eliminates any tendency of the bearing blocks to jam against the bearing surfaces during the make-up of the dovetail elements.

When the form of the invention illustrated in Figs. 7 to 10 of the drawings is in use, the bearing surfaces 17 of the two bearing members 14 engage with the bearing surfaces 42 of the slidable bearing blocks 41 substantially simultaneously when the door is moved into its closed position if the door is in proper alinement with the door frame. In case the door is slightly out of alinement, one of the bearing members 14 will first contact with one of the slidable bearing blocks 41 and this bearing block will be forced inwardly with respect to the other block 41 until the resistance to its further movement is sufficient to bring the door into proper alinement, with both bearing surfaces 17 in contact with their cooperating surfaces 42, whereupon the two bearing blocks 41 move inwardly with the recess element, as a unit, until the door is in position for the latch bolt 10 to engage with the main catch element 22 to retain the door in its closed position.

Figure 11:
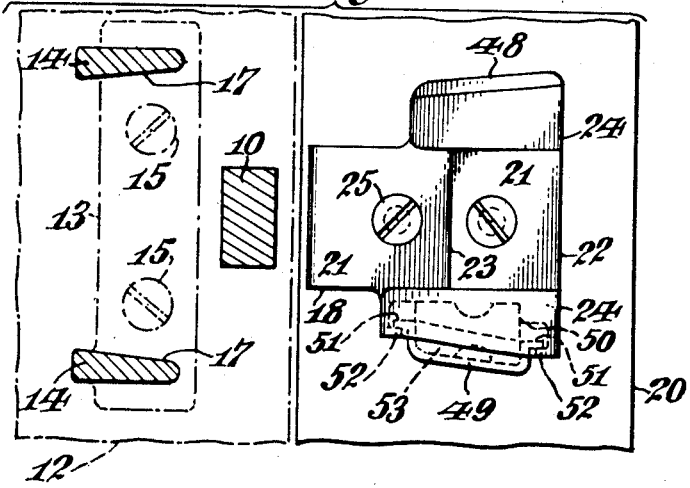
Fig. 11 is a front elevational view of another form of combined latch keeper and dovetail wedge element, the cooperating dovetail recess element and latch bolt being shown in section and out of cooperative position with respect thereto.
Figure 12:
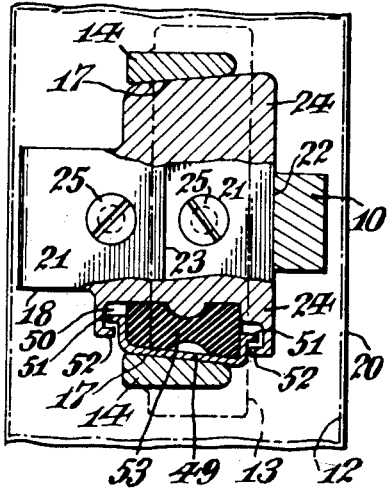
Fig. 12 is a vertical sectional view, partly in elevation, showing the position occupied by the parts of the device of Fig. 11 when the door is in fully closed position.
Figure 13:
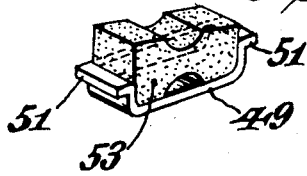
Fig. 13 is a perspective view of the bearing member of the dovetail wedge element shown in Fig. 11, also the resilient means for resisting movement of the bearing member.

In the modified form of the combined latch keeper and dovetail wedge member shown in Figs. 11 to 13 of the drawings, one of the lateral extensions 24, preferably the upper one, is provided with fixed bearing means in the form of an inclined bearing surface 48 on the free end of the extension for cooperation with the bearing surface 17 of the upper bearing member 14 of the dovetail recess element. The lower extension 24 is provided with inclined bearing means 49 which is movable with respect to the fixed bearing surface 48. The movable bearing means 49 is preferably formed from a strip of rigid metal having its intermediate portion projecting outwardly of a recess 50 in the lower extension 24 and having its opposite ends bent to extend into the recess. The extreme end portions of the strip are bent angularly as at 51 for engagement behind inturned lips 52 on the end walls of the recess 50 to limit the movement of the bearing member 49 away from the bearing means 48 under the influence of a block of rubber or other resilient means 53 seated in the recess 50.

While this form of combined latch keeper and dovetail wedge element is somewhat simpler in construction than the forms heretofore described, the wedge member thus formed is sufficiently resilient to permit the door to move into its fully closed position without danger of the bearing members 14 of the recess element jamming against the bearing means on the wedge element. As will be noted from Fig. 12 of the drawings, the structure of the movable bearing member 49 and the manner in which it is supported in the recess 50 are such as to provide a rocking movement for this bearing member, as well as bodily movement thereof toward the rigid bearing surface 48, as the door moves into fully closed position. In other words, if the advancing end of the lower bearing member 14 first contacts with the outer end of the inclined surface of the movable bearing member 49, that portion of the rubber block immediately beneath the point of contact will first be compressed and the bearing member 49 will partake of a rocking movement as the lower bearing member 14 of the recess element moves inwardly with the closing movement of the door. In case the door is out of alinement by reason of sagging after continued use, the fixed bearing means 48, cooperating with the upper bearing member 14, serves to lift the door into its proper position with respect to the frame and with the lower bearing member 14 in engagement with the movable bearing member 49, and to retain it rigidly in such position and to prevent it from vibrating against the frame when it is closed.

While a single movable bearing member has been shown with the modified form of combined latch keeper and dovetail wedge member illustrated in Figs. 11 to 13, it will be understood that the upper extension 24 may also be provided with a movable bearing member similar to the one shown in connection with the lower extension. In either case, it is desirable that the resilient block of rubber or other material be sufficiently resistant to compression to support the door against noise-producing vibrations when in its closed position.

In the modification of the invention illustrated in Figs. 14 to 17 of the drawings, fixed bearing means is provided on the upper extension 24 in the form of an inclined bearing surface 54 on the free end of the extension for cooperation with the bearing surface 17 on the upper bearing member 14 on the dovetail recess element. The lower extension 24 is formed with a recess 55 having an outer wall 56 from which two guide lugs 57 and 58 extend for supporting and guiding a bearing block 59 constructed for both sliding and rocking movement upon the bearing surface formed by the bottom wall 60 of the recess. The door frame forms the inner wall of the recess 55 when the combined keeper and wedge element is mounted thereon. One edge of the block 59 projects out of the recess 55 and is provided with a flat bearing surface 61 for cooperation with the bearing surface 17 on the lower bearing member 14 of the recess element. The inner edge of the block 59 is preferably curved throughout its length, as shown at 62, to facilitate the rocking movements of the block with respect to the bearing surface 60.

The guide lug 57 extends through an elongated opening 63 in the bearing block 59, this opening being of a size to permit considerable movement of the block laterally thereon in all directions. A coiled spring 64 in the opening 63 has one end seated against the lug 57 and its opposite end in contact with an end wall of the opening 63, and serves to resist movement of the block in the direction of closing movement of the door. A V-shaped notch 65 in the outer end of the block serves to guide this end of the block in its rocking movement and to retain the block in position in the recess 55 when the door is open and the lower bearing member 14 is out of engagement therewith.

As will be noted from Fig. 14 of the drawings, the bearing surface 61 of the bearing block 59 is in such a position when the lower bearing member 14 of the dovetail recess element is out of engagement therewith that the two cooperating bearing surfaces 17 and 61 converge in the direction of closing movement of the door. With this arrangement of the bearing surfaces, the engagement of the advancing end of the lower bearing member 14 with the bearing block 59 as the door moves into closed position operates both to rock the bearing block upon the bearing surface 60 and slide it thereon in the direction of closing movement of the door. The rocking movement of the bearing block therefore permits a certain degree of make-up between the movable bearing block 59 and the lower bearing member 14 of the recess member, and when the parts are in the made-up position the bearing block 59 is free to slide on the bearing surface 60 until the door is fully closed, as shown by the position of the parts in Fig. 15. When the latch bolt 10 is released for the purpose of opening the door, the movable bearing block 59 is urged in the direction of door opening movement by means of the coiled spring 64, and the upper edge of the V-shaped notch 65 serves to guide the outer end of the block inwardly toward the bearing surface 60, into the position shown in Fig. 14.

Although but one movable bearing member has been illustrated with the form of the invention shown in Figs. 14 to 17 of the drawings, it will be understood that a movable bearing member similar to the one described in connection with the lower extension 24 may be utilized in place of the fixed bearing means formed by the bearing surface 54, if desired.

The parts of the various modified forms of the invention are assembled on an automobile in the manner heretofore described with respect to the device shown in Figs. 1 to 6. With combined dovetail and latch structures such as disclosed herein, it will be apparent that the position of the latch bolt on the door determines the location of the dovetail recess element thereon, and that the only adjustment of parts that is required is the adjustment of the unitary latch keeper and dovetail wedge on the door frame in order that this combined structure may cooperate properly with the latch bolt and dovetail recess element on the edge of the door.

While specific forms and arrangements of the various parts of the improved structure have been disclosed, it is to be understood that the disclosure is illustrative only and that changes in form and arrangement of the elements may be made without departing from the invention, the scope of which is to be determined by the appended claims.

What is desired to secure by Letters Patent is:

1. A dovetail for preventing rattling between a door and a door post comprising, in combination, a recess member formed to define a pair of opposing rearwardly converging walls, a wedge having rearwardly converging sides, a pair of blocks slidably supported on said sides of said wedge and disposed to cooperate with said walls, and means comprising abutments formed on said wedge and slots formed in said blocks for retaining said blocks upon said wedge.

2. A door dovetail comprising, in combination, a recess member formed to define a pair of spaced rearwardly converging walls, a wedge adapted to be received between said walls and having oppositely converging sides, and a block slidably received between each said side and the adjacent wall, each block being movably attached to said wedge and having its sides tapered to correspond generally to the taper of the associated side and wall.

3. A door dovetail comprising, in combination, a recess member formed to define a pair of spaced rearwardly converging walls, a wedge adapted to be received between said walls and having oppositely converging sides, a block slidably received between each said side and the adjacent wall, each block having its sides tapered to correspond generally to the taper of the associated side and wall, and means forming supporting connections between the wedge and the blocks.

4. In a combined latch and dovetail structure, a keeper plate adapted to be secured to a door frame for engagement by the latch bolt of the door, a pair of rigid lateral extensions on opposite edges of said striker plate respectively, rigid dovetail bearing means mounted on said respective extensions, bodily movable relatively to each other and having outer bearing surfaces in divergent relation, and a pair of spaced, rigid dovetail bearing members adapted to be secured to the edge of the door on opposite sides of the latch bolt thereof, the opposing faces of said bearing members diverging from each other and being adapted to cooperate with said dovetail bearing means to position the door with respect to the door frame during the final closing movement of the door and to retain the door in such position while it is closed.

5. In a combined latch and dovetail structure, a base plate, a latch keeper on one side of said base plate, rigid, lateral extensions on opposite edges of said base plate and said latch keeper, rigid, converging, dovetail bearing elements on the ends of said extensions and bodily movable toward and away from each other, and means for adjustably securing said base plate to a door member, whereby the adjustment of such base plate correspondingly adjusts both said latch keeper and said dovetail bearing elements.

6. A combined latch and dovetail structure comprising a base plate, a tapered keeper member on one side of said base plate, rigid, lateral extensions formed on opposite edges of said base plate and said keeper member, and rigid bearing means on the ends of said extensions, movable both longitudinally of said base plate and keeper member and toward and away from each other, and having outer bearing surfaces arranged in converging relation.

7. A combined latch and dovetail structure comprising a keeper member, separate dovetail bearing means independently supported on opposite edges of said keeper member respectively, and forming a dovetail wedge element, one of said bearing means including a rigid bearing member bodily movable both longitudinally of said keeper member and toward and away from the other bearing means, and resilient means for resisting movement of said bearing member.

8. A combined latch and dovetail structure comprising a keeper plate adapted to be secured to a door frame for engagement by the latch bolt of the door, a pair of oppositely arranged, rigid, lateral extensions on said keeper plate, rigid dovetail bearing means resiliently mounted on said extensions with their outer surfaces in divergent relation, and a pair of spaced, rigid, dovetail bearing members rigidly connected together and adapted to be secured to the edge of a door on opposite sides of a latch bolt thereof, the opposing faces of said bearing members diverging from each other and being adapted to cooperate with said dovetail bearing means to position the door with respect to the door frame during the final closing movement of the door and to retain the door in such position while it is closed.

9. A combined latch and dovetail structure comprising a keeper plate adapted to be secured to a door frame for cooperation with the latch bolt of the door, a pair of rigid, lateral extensions oppositely arranged on said keeper plate, rigid, dovetail bearing means on each of said extensions, at least one of said bearing means being movably mounted on its extension, resilient means for resisting movement of said movable bearing means in one direction, and a pair of spaced, rigid, dovetail bearing members rigidly connected together and adapted to be secured to the edge of the door on opposite sides of the latch bolt thereof, the opposing faces of said bearing members diverging from each other and being adapted to cooperate with both of said dovetail bearing means.

10. A combined latch and dovetail structure comprising a keeper plate adapted to be secured to a door frame for cooperation with the latch bolt of the door, a pair of rigid, lateral extensions oppositely arranged on said keeper plate, rigid, dovetail bearing means on one of said extensions and having an inclined bearing surface thereon, the other extension having a recess therein, a dovetail bearing element bodily movable in said recess and projecting outwardly therefrom, resilient means urging the movable bearing element toward the limit of its movement in one direction, and a pair of spaced, rigid, dovetail bearing members adapted to be secured to the edge of the door on opposite sides of the latch bolt thereof, the opposing faces of said bearing members diverging from each other and being adapted to cooperate with both of said dovetail bearing members.

11. A combined latch and dovetail structure comprising a base plate adapted to be secured to a door member with one side in abutting relation thereto, a keeper member on the opposite side of said base plate, a pair of bearing members mounted on opposite edges of said base plate for limited sliding movement thereon longitudinally of said base plate and toward and away from each other and having converging bearing surfaces, and resilient means resisting sliding movement of said bearing members in one direction.

12. A combined latch and dovetail structure comprising a tapered keeper member, means for securing said keeper member to a door member, rigid extensions laterally arranged on opposite edges of said keeper member, rigid, dovetail bearing means on the end of one of said extensions, the other extension having a recess therein, a rigid, dovetail bearing member slidably mounted in said recess for limited movement transversely of said last-mentioned extension and having a bearing surface outside of said recess, and spring means for resisting sliding movement of said bearing member in one direction.

13. A combined latch and dovetail structure comprising a tapered keeper member adapted to be secured to a door member, bearing means formed on one edge of said keeper member, a bearing member slidably mounted on the opposite edge of said keeper member for movement lengthwise of said keeper member, and resilient means for resisting sliding movement of said bearing member in one direction.

14. A combined latch and dovetail structure comprising a keeper plate adapted to be secured to a door frame for co-operation with the latch bolt of a door, and having inclined, dovetail bearing means on one edge thereof, the opposite edge of said keeper plate having an inclined bearing surface, a dovetail bearing block having one edge slidably mounted on said bearing surface, resilient means for opposing sliding movement of said bearing block in one direction, and a pair of spaced dovetail bearing members adapted to be secured to the edge of the door on opposite sides of the latch bolt thereof, and having opposing faces arranged in divergent relation and adapted to co-operate with said dovetail bearing means and said dovetail bearing block.

15. In a combined latch and dovetail wedge member, a keeper plate comprising a plurality of tapered catch members, dovetail bearing means on one edge of said keeper plate, a plurality of spaced supports on the opposite edge of said keeper plate, a dovetail bearing block slidably mounted on said supports, and spring means interposed between said block and one of said supports for resisting sliding movement of said block in one direction.

16. A combined latch and dovetail structure comprising a keeper plate adapted to be secured to a door frame for cooperation with the latch bolt of the door, a pair of rigid bearing members supported on said keeper plate and having diverging bearing surfaces thereon, a pair of spaced, rigid bearing members adapted to be supported on the edge of the door on opposite sides of the latch bolt thereof and having diverging bearing surfaces thereon complementary to the first-mentioned bearing surfaces for cooperation therewith, one pair of said bearing members being fixed with respect to its support, means for mounting the other pair for movement with respect to its support when engaged by the fixed pair of bearing members, and resilient means for resisting movement of the movable bearing members upon engagement with the fixed bearing members.

ROBERT W. BUTLER.